United States Patent Office 3,104,509
Patented Sept. 24, 1963

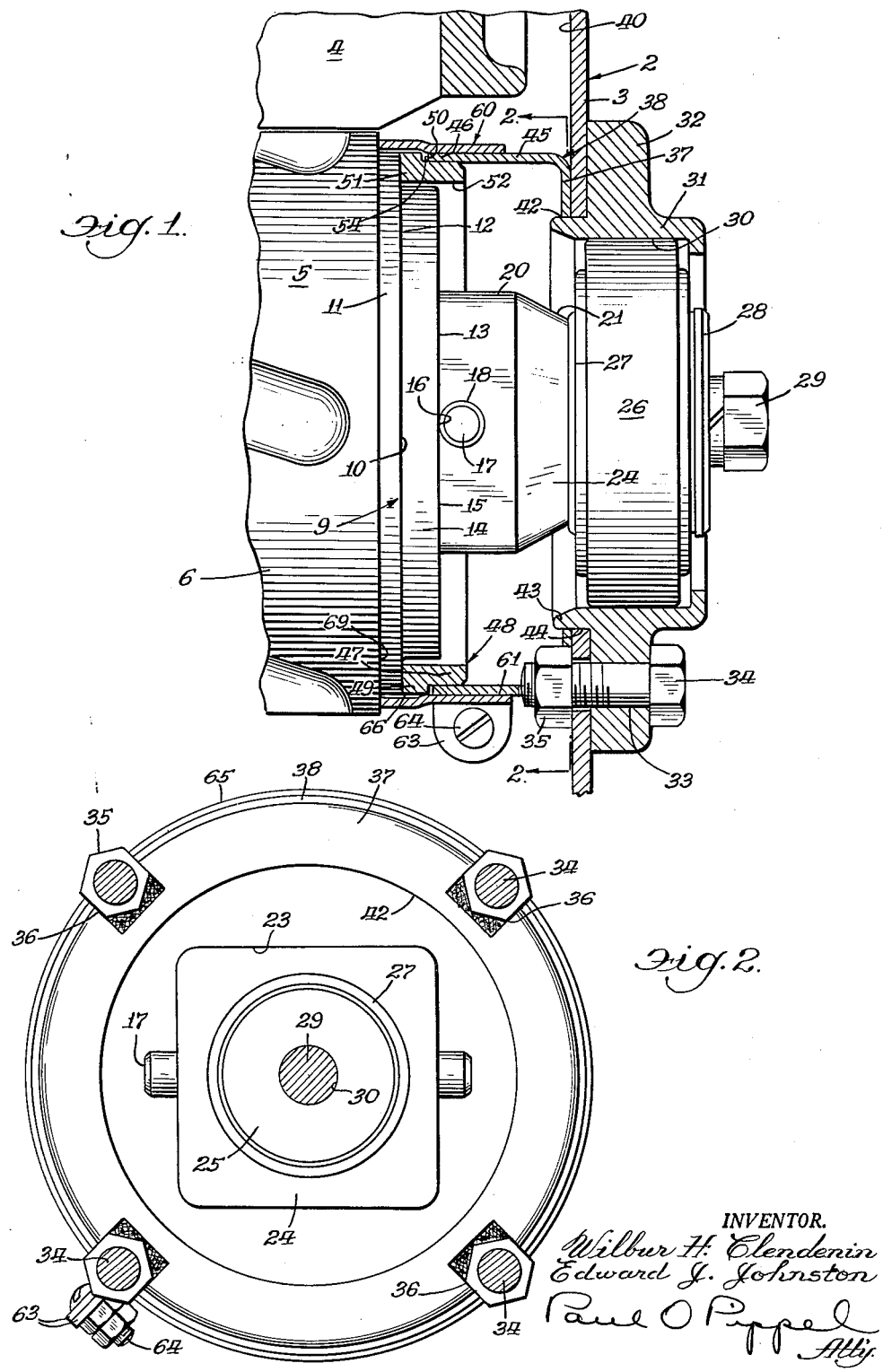

3,104,509
ANTI-WRAP SHIELD STRUCTURE FOR ROTATING CROP HANDLING DEVICE
Wilbur H. Clendenin, Downers Grove, and Edward J. Johnston, La Grange Park, Ill., assignors to International Harvester Company, Chicago, Ill., a corporation of New Jersey
Filed Oct. 21, 1960, Ser. No. 64,164
8 Claims. (Cl. 56—1)

This invention relates to the shield structure and more specifically to the shield for a roller of a hay conditioning machine.

Particularly in certain types of hay-processing or gathering equipment, it has been found that exposed shafts present a very serious problem with the material winding on the shaft so tightly that eventually the machine either stops or malfunctions or the part breaks. In order to eliminate or cure this problem, we have tried, initially with some success, providing a cylindrical stationary sleeve which extended over the end of the shaft. In many instances, this operated successfully. However, certain problems have also arisen, particularly in hay conditioning machines wherein the body of the crushing rollers, which is mounted on the shaft with which it rotates, is composed of elastomer material and this is sensitive to excessive heat in that the rubber or other elastomer material tends to deteriorate, burns or melts, or is otherwise affected. We have found that with the metal shields, because of distortions in the frame mounting the roller or distortion in the shield, that the metallic shield would rub against the metallic parts of the shaft which with the roller is operating at a high speed the shaft would become extremely hot due to friction which would cause the adjacent elastomer material of the roll to break down and the seal of the bearing supporting the roller shaft to fail. In some instances, we have also found that even with close fits between the shield and the rotating shaft assembly that strands of hay or other material would wedge in between the shield and the shaft assembly of the roller which would also misalign the parts so that the shield and the shaft assembly would rub and overheat.

In order to provide a positive cure for this condition, we have so constructed an oversize shield for the shaft so that there is considerable space radially between the shield and the shaft assembly, and in this space I have provided a novel non-metallic ring which is preferably made of nylon so that if there should occur any misalignment between the shield and the shaft no metal-to-metal contact could occur, and, therefore, in view of the self-lubricating qualities of the nylon, the problem of heating is entirely eliminated. Even with these precautions, I have found that at times, depending on the material in which the machinery is operating, that the material also tends to wedge in and if a sufficiently long strand is caught it builds up and it distorts the sealing ring and wraps. In order to prevent such an occurrence, we have provided a novel guard structure including a non-metallic ring to prevent direct metal-to-metal contact between the shield and the shaft, the ring being located in an area intermediate the ends of the shield, one end of the shield projecting over and closely fitting the shaft member which is located in concentricity with the shield by the sealing ring.

These and other objects and advantages encompassed in the invention will become more readily apparent from the specification and the drawings, wherein:

FIGURE 1 is a fragmentary axial sectional view of the shield structure as applied to a roller of a hay conditioning machine, and FIGURE 2 is a sectional view taken approximately on the line 2—2 of FIGURE 1.

*Description of the Invention*

Describing the invention in detail and having particular reference to the drawings, the mechanism chosen by way of illustration comprises a hay conditioner of the type shown in U.S. Patent 2,932,143 and includes a support frame comprising a vertical side sheet 3 on each side mounting upper and lower crushing or conditioning rollers 4 and 5.

The invention is shown as applied to the roller 5 although it will be understood that it is equally applicable to roller 4. The lower roller comprises a body of elastomer material 6, such as rubber or a combination of rubber and fabric cord such as tire carcass material and the like and well known to those skilled in the art, which is sleeved unto a shaft 5 and held thereon in tightly axially compressed condition by means of an end cap 9 at each end, cap 9 comprising an annular disklike portion 10 having a circular periphery 11 and a radial surface 12 which merges into an axially outwardly extending axial ringlike portion 13 which presents an annular or cylindrical outer peripheral surface 14. The outer side 15 of the portion 13 engages as at 16 with a pin 17 which extends radially through an aperture 18 in the inner segment 20 of the end portion 21 of the center shaft 7. It will be observed that the end cap 9 is provided with a substantially square center opening 23 which is complemental to the shape of the major portion of the shaft 7 and is interlocked therewith for rotation. The portion 20 of the shaft is preferably cylindrical and is tapered outwardly as at 24 and merges with a journal end portion 25 which projects through a bearing 26, the bearing 26 being held against axial movement on the shaft between the shoulder 27 at the inner end of the end portion 25 of the shaft and a washer 28 which is urged against the outer side of the bearing 26 by means of a capscrew 29 which is threaded into the threaded bore 30 of the end portion 25.

The bearing 26 fits complementally within an axial bore 30' in a mounting cap 31 which has a peripheral radial flange 32 provided with a series of apertures 33 through which extend bolts 34 which thread into nuts 35 which are located within radial notches 36 in the radial flange 37 of the shroud generally designated 38.

The shroud or guard or shield is disposed against the internal side 40 of the side plate or wall 3 with its flange 38 which is provided with a central aperture 42 which closely admits the axial annular extension 43 of the cap 31, the extension 43 also projecting through an aperture 44 in the wall 3. Thus, it will be seen that the cap 31 and the shroud or the guard 38 are embracing wall 3 therebetween and are secured thereto by the bolts 34 and the nuts 35.

The guard 38 has an annular or tubular portion 45 which projects axially over the shaft portion 20 in radially outwardly spaced relation thereto from the flange 37 and the inner end 46 of the tubular portion 45 telescopes and snugly receives the periphery 47 of the nylon guide and sealing element generally designated 48. It will be seen that the member 48 has an annular outer shoulder 49 which overlaps the inner edge 50 of the sleeve 45 and that it has an edge 51 which provides a substantially radial surface which opposes the surface 10 on the end cap and plate portion 11 and is preferably in engagement therewith. However, the interior periphery 52 of the ring 48 is spaced radially outwardly of the surface 14. This condition arises when the parts are in true alignment with each other; however, it will be readily appreciated that there is clearance provided at 54 between the edge 50 and the shoulder 49, whereby, should the shield 38 be misaligned with respect to the axis of the shaft assembly then engagement may occur along limited areas between the surface 52 and the surface 12. It will be realized that the function and the purpose of the ring 48 is principally to prevent metal-to-metal contact between the tubular portion 45 and the metallic end cap 9.

In order to avoid the possibility of any material wedging in between the ring 48 and the end cap 9 there is provided an extension generally designated 60 which is a substantially sleevelike member having an outer end portion 61 which snugly clamps over the inner end portion 46 of the shield 45 and is substantially complemental thereto and has a pair of radially outwardly extending clamping ears 63 which admit a bolt and nut assembly 64 therethrough by means of which the extension is tightly clamped on to the portion 45. The extension 60 has an inner end portion 65 which is offset outwardly from the portion 61 and is of a slightly larger diameter and telescopes over the outer peripheral surface 66 of the annular shoulder 49 on the ring 48 and projects over and is spaced radially outwardly from the surface 11 and extends to the end surface 69 of the body 6 of the roller. Thus, it will be seen that the non-metallic or guard ring 48 serves not only to maintain substantial concentricity between the shield and the shaft assembly but also positively prevents any metal-to-metal engagement between the shield structure of which the extension 60 is part and any metallic portion of the shaft assembly.

It will be understood that various other forms of the invention will become readily apparent to those skilled in the art within the scope of the appended claims.

What is claimed is:

1. In a rotating crop-engaging device having a metallic rotary part, a journal therefor, a crop anti-wrap shield for the rotary part comprising a stationary tubular part sleeved over the rotary part, at least a portion of the tubular part being non-metallic and engageable with the rotary part in misaligned condition of the parts and holding other portions of the tubular part spaced from the rotating part.

2. In a rotating crop-engaging device having a heat-deteriorable portion and a metallic portion rotatable therewith, a support including journal means rotatably mounting said metallic portion, a cylindrical metallic shield telescoped over the metallic portion and mounted upon the support generally concentric with the rotational axis of the metallic portion, said shield having a non-metallic portion engageable with the metallic portion upon the shield and metallic portion being non-concentrically positioned.

3. In a material anti-wrap shield for a hay conditioning roller having a body of elastomer material which deteriorates upon overheating, a sahft mounting the body and having an end portion projecting beyond the body, a support journaling the shaft end portion, a metallic shield mounted upon the support over the end portion of the shaft, and a nylon spacer and seal interposed between the shaft and shield.

4. In combination with a hay conditioning roller having a substantially cylindrical body of elastomer material, a shaft extending from an end of the body, a cap on the shaft engaging said end of the body and presenting an annular surface stepped radially inwardly of the periphery of the body, a support, means journaling the shaft from the support, a cylindrical sleeve on the support substantially concentric with the shaft and overlapping said annular surface and stepped inwardly of the periphery of the body, and a nylon annulus within the sleeve closely fitting about said surface.

5. The invention according to claim 4 and said surface and said annulus disposed intermediate the ends of the sleeve.

6. The invention according to claim 4 and said cap having a radial surface proximate said annular surface, and said annulus having a radial surface engageable with the beforementioned radial surface.

7. The invention according to claim 6 and said cap having a second annular surface contiguous to the roll body and outwardly offset from the first-mentioned annular surface and said shield having an outwardly offset portion overlapping said second surface.

8. The invention according to claim 6 and said cap having a second annular surface contiguous to the roll body and outwardly offset from the first-mentioned annular surface and said shield having an outwardly offset portion overlapping said second surface and said radial surface disposed intermediate said annular surfaces.

References Cited in the file of this patent
UNITED STATES PATENTS

| | | |
|---|---|---|
| 2,157,597 | Dupree | May 9, 1939 |
| 2,189,686 | Stevenson | Feb. 6, 1940 |
| 2,932,143 | Morkoski | Apr. 12, 1960 |
| 2,954,656 | Koch et al. | Oct. 4, 1960 |